May 27, 1930. C. M. TEMPLETON 1,759,922
ADJUSTABLE SEAT SUPPORT
Filed March 7, 1927
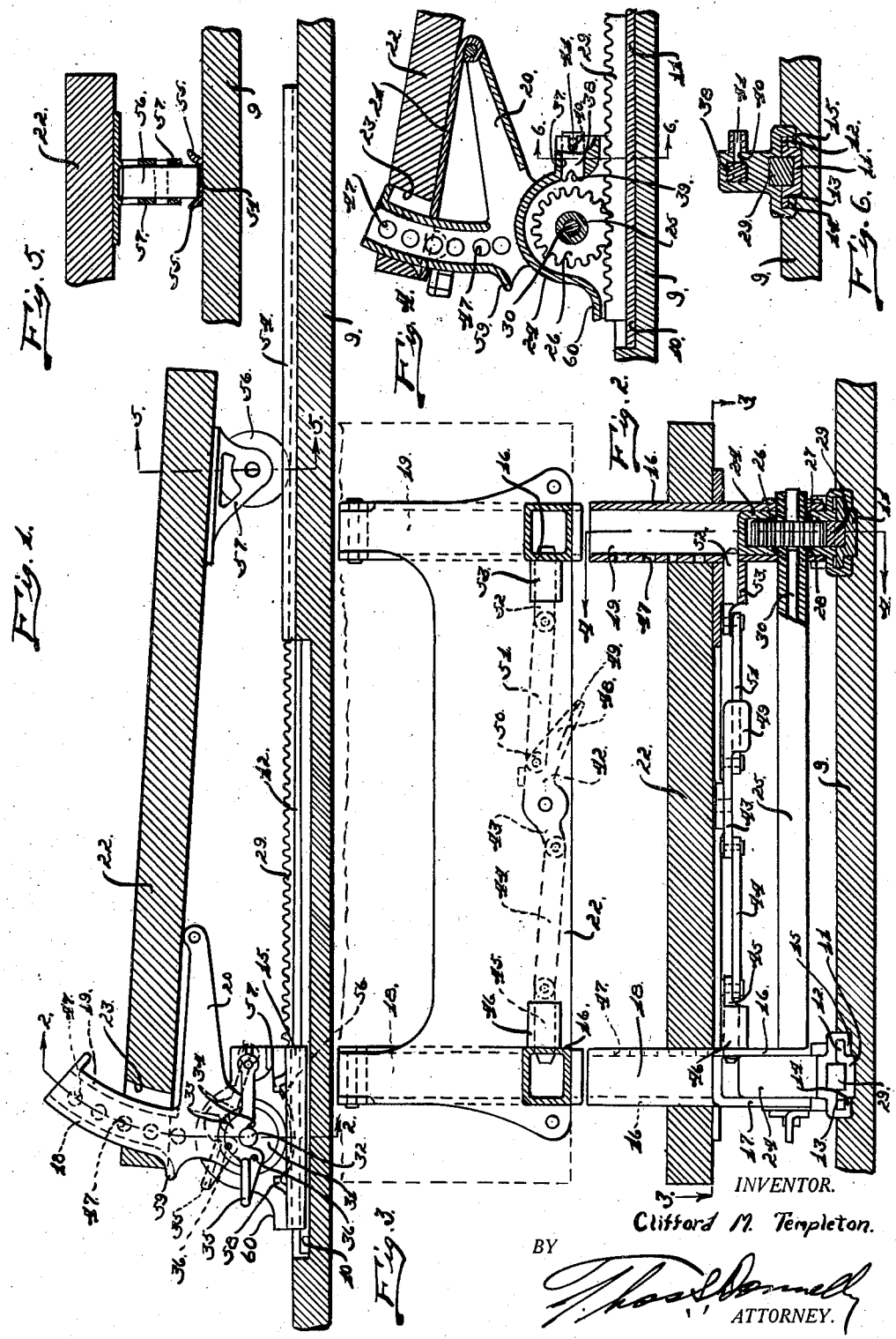
INVENTOR.
Clifford M. Templeton.
BY
ATTORNEY.

Patented May 27, 1930

1,759,922

UNITED STATES PATENT OFFICE

CLIFFORD M. TEMPLETON, OF DETROIT, MICHIGAN

ADJUSTABLE SEAT SUPPORT

Application filed March 7, 1927. Serial No. 173,422.

My invention relates to a new and useful improvement in an adjustable seat support adapted particularly for use on vehicles where it is desirable to adjust the position of the seat into different locations.

An object of the invention is the provision of a seat support which will permit the movement of the seat bodily rearwardly and forwardly of the vehicle to different positions and serve to lock the seat in its different positions of adjustment.

Another object of the invention is the provision of a seat support of this class whereby the seat may be swung on its pivot to upright position.

Another object of the invention is the provision of a seat support whereby the forward part of the seat may be raised and lowered, the seat in this movement swinging on the rear as a pivot.

Another object of the invention is the provision of a seat support of this class in which a locking mechanism may be employed for locking the seat in its various positions of tilt.

Another object of the invention is the provision of a simple and easily operated mechanism for releasing the seat for movement rearwardly or forwardly of the vehicle.

Another object of the invention is the provision of a device of this class which will be simple in structure, economical of manufacture, highly efficient in use and affording a maximum amount of adjustment.

Other objects will appear hereinafter.

The invention consists in the combination and arrangement of parts hereinafter described and claimed.

The invention will be best understood by a reference to the accompanying drawings which form a part of this specification and in which Fig. 1 is a sectional view through a seat embodying the invention showing the invention in side elevation.

Fig. 2 is a sectional view taken on substantially line 2—2 of Fig. 1.

Fig. 3 is a sectional view taken on substantially line 3—3 of Fig. 2.

Fig. 4 is a sectional view taken on substantially line 4—4 of Fig. 2.

Fig. 5 is a sectional view taken on substantially line 5—5 of Fig. 1.

Fig. 6 is a sectional view taken on substantially line 6—6 of Fig. 4.

In the drawings I have shown the floor 9 of the car body with which the device is used grooved out as at 10 for the reception of a track 11 having a channel formed therein, from opposite sides of which project outwardly flanges 12 and 13, these flanges being embraced by the overturned flanges 14 and 15. Positioned at each side of the seat or in such locations as may be determined, are supports comprising side walls 16 and 17, rear wall 18 and a front wall 19, these parts being preferably formed from a pair of cooperating stampings which may be welded or otherwise secured together at their adjoining edges. Projecting outwardly from these supports are arms 20, each of which is pivotally connected at its free end to the rear edge of a plate 21 which is secured to the base 22 of the seat, the seat being provided with a slot 23 in which engages these supports. A housing 24 is provided, from the base of which extends outwardly the overturned flanges 14 and 15. Projecting into the housings 24 is a tubular shaft 25 upon which is journalled a gear 26, collars 27 and 28 being positioned at opposite sides of the gear 26 in the housing 24 for the purpose of reducing vibration and rattling. The gears 26 are adapted to mesh with a rack bar 29 which is positioned in the channel formed in the track 11.

Projecting through the tubular shaft 25 is a shaft 30 which extends exterior of the housing 24 and upon which is fixedly mounted a disc 31 carrying on its face, concentrically arranged, a disc 32 which is adapted to engage in the semi-circular recess 34 formed in the lever 33 which is pivotally connected by the pin 36 to the face of the disc 31. The forward end of the lever is provided with an offset gripping portion 35.

Projecting rearwardly from the housing 24 is a tubular boss 37 in which is slidably mounted a locking plunger 38 having at its forward side a pair of teeth 39 for meshing with the teeth of the gear 26. The rear end of the lever 33 is pivotally connected by the pin 41 which rides in the slot 40 formed in the projection 37 to the plunger 38 so that when the disc 31 is rotated to move the pin 36 upwardly, a rearward movement of the locking plunger 38 is effected to disengage the teeth of the gear 26, as shown in Fig. 4. When the disc is moved in the opposite direction so as to bring the pin 36 beyond center, the teeth 39 of the plunger 38 will mesh with the teeth of the gear 26, and securely lock the gear 26 against rotation.

Mounted on the undersurface of the plate 21, adjacent its forward edge and preferably centrally thereof, is a rockable lever 42 provided with a lug 43 projecting outwardly from one side thereof and pivotally connected to the link 44, the other end of which is pivotally connected to the locking dog or plunger 45 which is slidably mounted in the guide 46 and adapted to engage in the openings 47 formed in the side walls 16. Pivotally connected as at 50 to the opposite side of the point of pivot of the lever 42 is a link 51, the opposite end of which is connected to the locking dog or plunger 52 which is slidably mounted in the guide 53 and adapted to engage in the openings formed in the side walls 16. A projection 48 is provided on the lever 42 having the angularly turned finger grip 49.

Fixedly mounted on the floor 22 is a guide track 54 having at opposite sides the upwardly extending, outwardly flared flanges 55, this guide track 54 serving as a wear plate for the roller or castor 56 which is supported by the bracket 57 on the undersurface of the seat 22, adjacent the rear side.

When it is desired to move the seat forwardly or rearwardly of the vehicle body 9, a retraction of the locking dog 38 from engagement with the teeth of the roller 26 is effected, after which the person sitting on the seat may very easily move the seat either forwardly or rearwardly to the desired position of adjustment. After the adjustment the seat may be locked in fixed position by moving the locking dog 38 into engagement with the teeth of the roller. If desired only one of these rollers may be mounted on the seat, the seat being suitably supported at the opposite side with a castor. In the drawings, however, I have shown a gear 26 mounted at opposite sides with the shaft 30 extending to opposite sides so that the locking dogs at opposite sides may be simultaneously moved.

By disengaging the plungers 45 and 52 from the openings in which they are engaged, the seat may be tilted, as shown in Fig. 4, to its various desired positions, the seat tilting on the axle upon which the castor 56 is mounted, the arms 20 also rocking on their pivotal connection with the plate 21.

It will be noted that the locking mechanism including the links 44 and 51, provide a toggle, the gripping member 59 serving as an abutment as the links 51 and 44 are swung past center. In this way the angularity of the seat relative to the vehicle body may be adjusted.

When desired, the seat may be tilted bodily by raising the rear end of the seat and tilting forwardly on the shaft 25 as an axis of pivot, the engagement of the teeth of the gears 26 with the rack bar preventing forward or rearward movement of the seat.

An anti-rattling spring 56 is engaged below the tongues 57 and 58 which are struck up from the base of the housing 24 to prevent rattling of the various parts while in use or while the adjustments are being made.

In this way I have provided an adjustable seat support which is easily and quickly moved to its various positions of adjustment and affords a maximum amount of adjustment, permitting the adjustment of the angularity of the seat to the floor of the car, a tilting of the seat bodily and a shifting rearwardly and forwardly of the seat relatively to the car body. When the seat is tilted forwardly on the axis of the shaft 25 the shoulder 59 will serve as an abutment to engage the forwardly projecting abutment forming portion 60 on the housing 24.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. In an adjustable seat support of the class described adapted for use with a body having a floor, a supporting member pivotally attached to said seat, adjacent one edge thereof; a rotatable member for supporting said supporting member, said rotatable member carrying said seat rearwardly and forwardly of said floor upon pressure exerted thereon in either direction; means for locking said rotatable member against forward and rearward movement; means for adjusting the angularity of said seat relative to said floor; and means for locking said seat in its various positions of angular adjustment.

2. An adjustable seat support of the class described adapted for use with a body having a floor, comprising: a supporting member; a rearwardly extending arm on said supporting member; means for pivotally connecting said arm to said seat, adjacent its forward edge, said seat having a slot formed therein; said supporting member projecting through said slot; slidable locking members for engaging in openings formed in said arm for locking said seat in various positions of angularity relatively to said floor; a gear carried by said supporting member; a rack bar mounted on said floor; slidable locking members for locking said gears against rotation and preventing rearward and forward movement of said seat relatively to said floor, said seat being freely movable rearwardly and forwardly upon release of said locking means from said gear; a rotatable member; an arm eccentrically connected to said rotatable member and adapted upon rotation of said member in one direction for moving said last mentioned locking members to inoperative position and upon movement in the opposite direction for moving said locking members to operative position.

3. In an adjustable seat support of the class described adapted for use with a body having a floor, a supporting member adapted for attachment to a seat; gears mounted on said supporting member; a rack bar on floor for meshing with said gears, forward and rearward pressure on said seat moving said seat in either direction; a member movable radially of said gears for engaging the same and preventing rotation of the same; a rockable arm for moving said member into engaging position and out of said engaging position; and an off-set finger grip on said arm.

In testimony whereof I have signed the foregoing specification.

CLIFFORD M. TEMPLETON.